C. W. Coe,
Drilling Machine,
No. 2,487. Reissued Feb. 19, 1867.
Fig. 1.
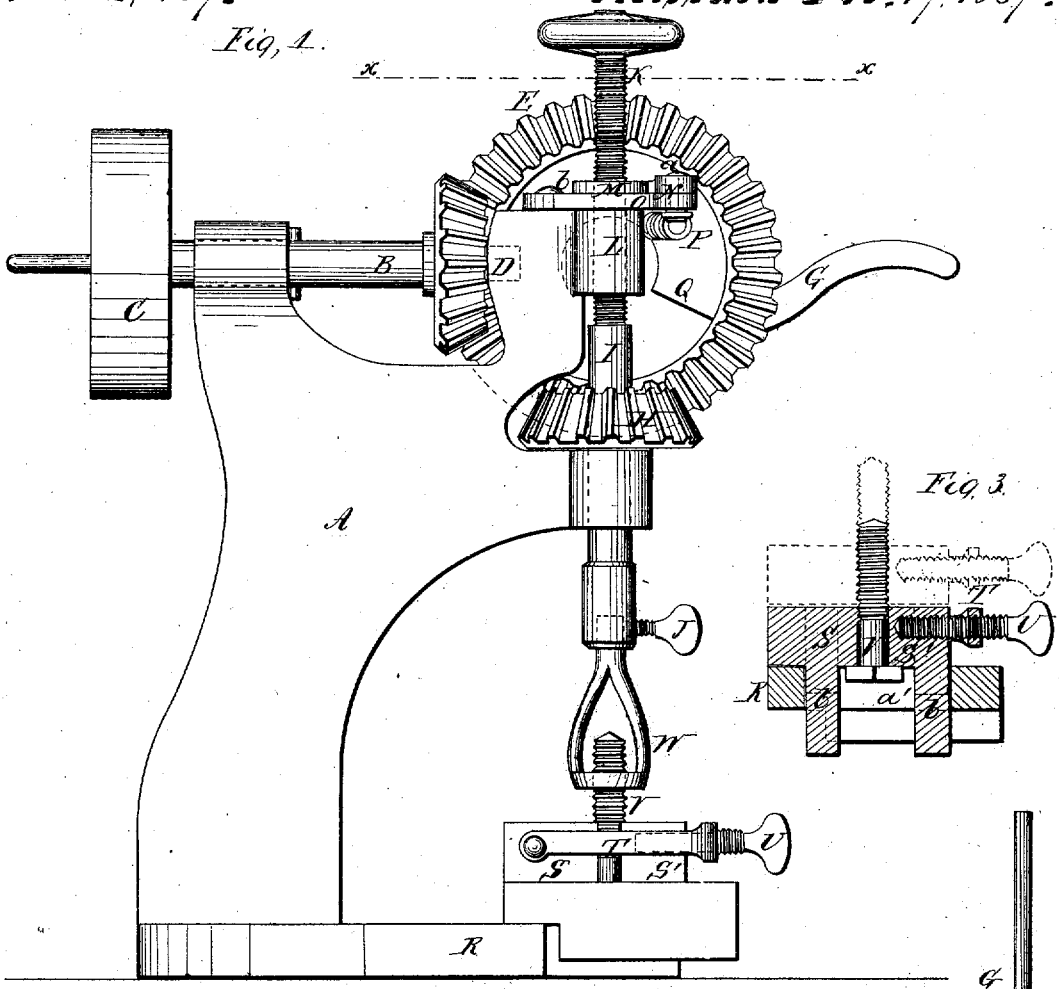
Fig. 3.
Fig. 2.
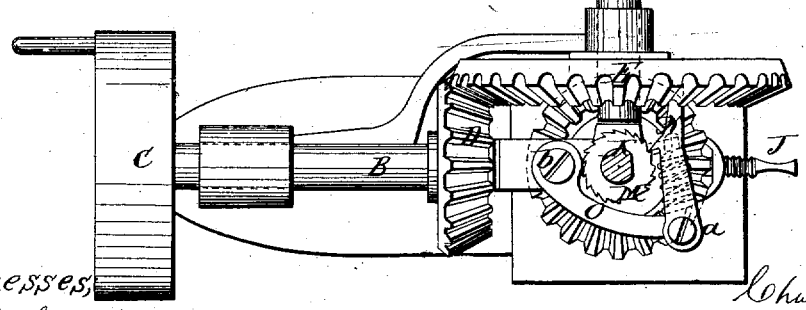
Witnesses,
H. V. Coombs
G. W. Reed
Inventor;
Chas. W. Coe
per Munn & Co
attorneys
N. PETERS, PHOTO-LITHOGRAPHER, WASHINGTON, D. C.

United States Patent Office.

CHARLES W. COE, OF FENTONVILLE, MICHIGAN.

*Letters Patent No.* 37,433, *dated January* 20, 1863; *reissue No.* 2,487, *dated February* 19, 1867.

IMPROVEMENT IN DRILLING AND BOLT-TAPPING MACHINES.

The Schedule referred to in these Letters Patent and making part of the same.

TO ALL WHOM IT MAY CONCERN:

Be it known that I, CHARLES W. COE, of Fentonville, in the county of Genesee, and State of Michigan, have invented a new and improved Drilling and Screw-Cutting Machine; and I do hereby declare that the following is a full, clear, and exact description thereof, reference being had to the accompanying drawings, making a part of this specification, in which—

Figure 1 is a side view of my invention.

Figure 2 is a plan or top view of the same, a screw pertaining to the invention being bisected horizontally, as shown at *x x* in fig. 1.

Figure 3, a detached central vertical section of a clamp and bed pertaining to the same.

Similar letters of reference indicate corresponding parts in the several figures.

This invention relates to a novel and improved arrangement of parts, as hereinafter fully shown and described, whereby a very simple and compact machine is obtained for the purpose of drilling and cutting screws, and one by which it is believed several advantages are obtained over those now in use.

To enable those skilled in the art to fully understand and construct my invention, I will proceed to describe it.

A represents a cast-metal frame or support, which is firmly secured to any suitable fixture, and B is a shaft, which is fitted horizontally in the upper part of the frame or support A, and has a fly-wheel C at one end of it, and a bevel-pinion D, at the opposite end. The pinion D gears into a bevel-wheel, E, the shaft F of which is fitted in suitable bearings on the upper part of the frame or support A, and at right angles to shaft B, as shown clearly in fig. 2. The outer end of the shaft F is provided with a crank, G. H is a bevel-pinion, which also gears into the wheel E. This pinion is fitted loosely on a shaft, I, or in such a manner that the shaft may rise and fall independently of the wheel, and the latter at the same time made to rotate said shaft. The shaft I is tubular at its lower end, and is provided with a set-screw J, by which a drill or screw-cutting die may be secured in it. K is a vertical screw, which works in a nut, L, on the upper part of the frame or support A. The lower end of this screw is connected by a swivel-joint with the upper end of the shaft I. On the screw K, above the nut L, there is placed a ratchet, M. This ratchet is fitted on the screw K in such a manner that it, when turned, will turn the screw, and at the same time admit of the latter rising and falling under the action of the nut L. The ratchet M is turned by means of a pawl, N, which is connected, by means of a pivot, *a*, to an arm, O, the latter being attached to the frame or support A by a pivot, *b*. A spring, P, is connected to the arm O, and this spring has a tendency to keep the outer or free end of the pawl N in contact with the face of the wheel E, which is of such a shape as to form a cam, Q, and operate the pawl N, so that the latter will turn the ratchet M, the latter, as it rotates, turning the screw K, the nut L causing the same to descend as it is turned so that the shaft I will be forced down, and the drill fed to its work. It is easy to throw the pawl N back, so that the cam Q can no longer operate thereon. In this case the drill must be fed to its work by hand, which is done by turning the screw K by means of the handle on wheel T, on top of said screw. The base R of the frame or support A has an oblong opening, *a'*, made through it vertically, to receive the shanks *b b* of the jaws S S', one of which, S, has the ends of a yoke, T, bolted to it. Through the semicircular end of this yoke a screw, U, passes, said screw also passing into the jaw S'. These jaws S S' are for the purpose of clamping or holding the rods on which screws are to be cut, (see fig. 3,) the rod V being placed between the jaws, and secured or clamped firmly between them by turning the screw U. The screw-cutting die W is secured in the lower end of the shaft I, and the pawl N is disengaged from the ratchet M, as no feed movement is required in this arrangement, the jaws S S' and rod V rising and falling under the action of the die W, the shanks *b b* of the jaws serving as guides for the same. The whole arrangement, it will be seen, is extremely simple, occupies but a small space, may be manufactured at a small cost; and at any time, when more power is required, for either drilling or screw-cutting, than can be obtained by turning the wheel E, the power may be applied to the shaft B, the increase of power in the latter case being due to the smallness of the diameter of the bevel-pinion D relatively with that of the wheel E. Thus it is seen that when great speed is required, the motion is applied to the wheel E, while, when more power is needed, the shaft D is revolved either by hand or by steam power, which may be applied to the pulley C. The machine is by this peculiar arrangement adapted to both heavy and light work, and combines both speed and power with simplicity and strength of construction.

Having thus described my invention, I claim as new, and desire to secure by Letters Patent—

1. The arrangement of the bevel gear-wheels D E and H in such a manner that the shaft I may thereby be revolved with more or less speed and power, for the different purposes to which the machine may be adapted, substantially as herein shown and described.

2. The automatic feed arrangement, consisting of the ratchet M, pawl N, spring P, and cam Q, whereby the drill is fed to its work, substantially as set forth, the said feed arrangement being so made that it can be detached and the drill fed by hand, substantially as herein shown and described.

3. In combination with the machine, I also claim the vise for holding bolts for making screws, said vise consisting of the jaws S S′ and screw U, arranged in the base R of the frame, substantially as herein shown and described.

4. I claim the combination of the shaft I and screw K with the pinion H and nut L, whereby the rotary motion is given to the drill, and also the necessary feed, substantially as herein shown and described.

CHARLES W. COE.

Witnesses:

WM. F. MCNAMARA,

ALEX. F. ROBERTS.